Figure 1:
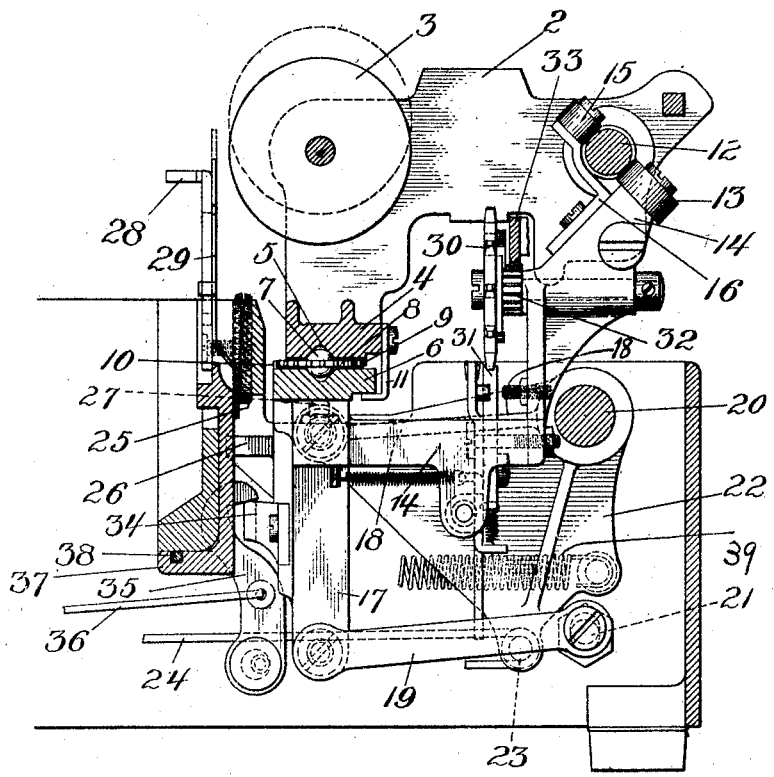

E. B. HESS.
BALL BEARING FOR TYPE WRITING MACHINE CARRIAGES.
APPLICATION FILED JAN. 10, 1910.

958,498.

Patented May 17, 1910.
2 SHEETS—SHEET 1.

E. B. HESS.
BALL BEARING FOR TYPE WRITING MACHINE CARRIAGES.
APPLICATION FILED JAN. 10, 1910.
958,498.
Patented May 17, 1910.
2 SHEETS—SHEET 2.
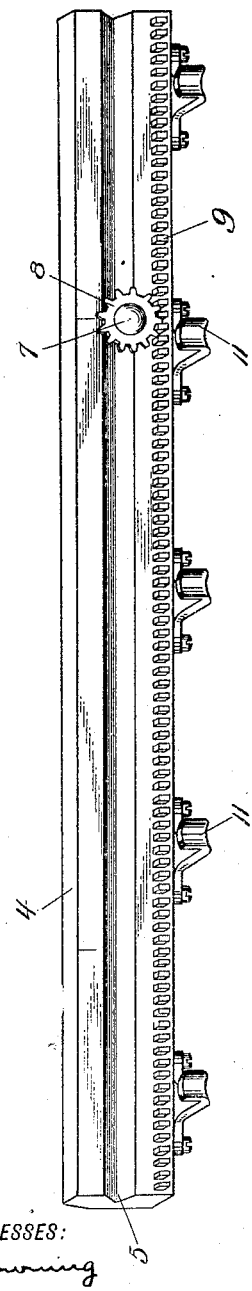
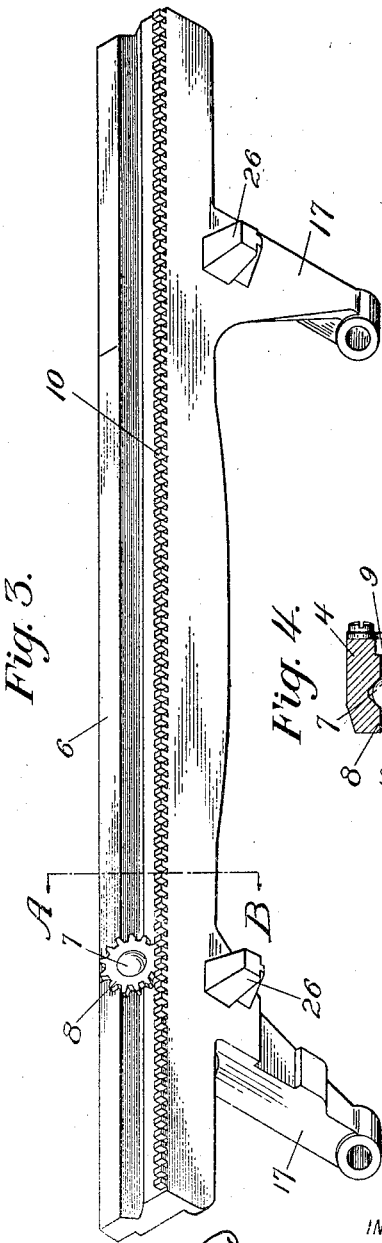
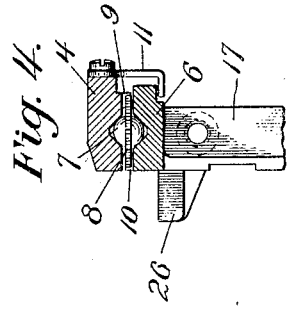
WITNESSES:
INVENTOR
Edward B. Hess
Edward C. Davidson
ATTORNEY

UNITED STATES PATENT OFFICE.

EDWARD B. HESS, OF NEW YORK, N. Y., ASSIGNOR TO ROYAL TYPEWRITER COMPANY, OF NEW YORK, N. Y., A CORPORATION OF NEW JERSEY.

BALL-BEARING FOR TYPE-WRITING-MACHINE CARRIAGES.

958,498.   Specification of Letters Patent.   Patented May 17, 1910.

Application filed January 10, 1910. Serial No. 537,235.

*To all whom it may concern:*

Be it known that I, EDWARD B. HESS, a citizen of the United States, residing in the borough of Manhattan, city, county, and State of New York, have invented certain new and useful Improved Ball-Bearings for Type-Writing-Machine Carriages, of which the following is a specification.

This invention relates primarily to roller bearings for the transversely reciprocating platen carriage of a bar typewriting machine, and is an improvement on the construction disclosed in my application No. 439,709, filed June 22, 1908.

The invention is shown embodied in a front strike visible typewriting machine.

In the accompanying drawing, Figure 1 is a vertical longitudinal section through the carriage end of the machine; Fig. 2, a perspective view showing the under face of the upper half of the ball race; Fig. 3, a similar view showing the upper face of the under half of the ball race; Fig. 4, a transverse section on the line A, B.

2 indicates one of the end plates of a vertically shiftable transversely traveling platen carriage and 3 a platen mounted therein. The side plates are connected beneath the platen by a transverse bar 4 having in its under face a longitudinal groove 5 forming one half of a ball race the opposite half of which is formed by a longitudinal groove in the carriage shift rail 6. In the ball race so formed are disposed a pair of steel bearing balls 7 each loosely encircled by an annular gear 8 horizontally disposed and meshing at the rear with a rack 9 formed in the under face of the transverse carriage bar 4 and at its front face with a rack 10 formed on the upper face of the carriage shift rail 6. The two rails 4, 6, are held together by clips 11 bolted to the carriage rail 4 and extending downwardly and under the edge of the carriage shift rail 6. The annular gears positively space the balls and prevent their displacement in respect to each other and at the same time impose upon the structure a minimum of resistance to travel of the carriage. The axes of the bearing balls are vertically in line below the axis of the platen. At the rear of the platen, there extends between the side plates, a shaft 12 whose axis is horizontally in line with the axis of the platen when the latter is in normal position. The shaft 12 runs upon a roller 13 carried by a bracket 14 fixed rigidly with the shift rail 6 in the center of the carriage and is held on the opposite side by a guard roller 15 secured in the end of a supplementary bracket 16 bolted to bracket 14.

At each end of the carriage shift rail 6, there is a vertically depending arm 17 to which arms are pivoted the front ends of parallel links 18, 19. The rear ends of links 19 are pivotally connected at 21 with the side plates of the machine; and the rear ends of links or arms 18 are rigidly connected with a rock shaft 20 from which there depends at the left hand side of the machine a web or arm 22 having a stud 23 engaged by a shift link 24 operated from the key board of the machine. When the link 24 is drawn forward, the carriage shift rail 6 is elevated to carry the platen to the upper case position indicated by dotted lines. This upward movement is limited by coöperating stops 25 on the main frame and 26 on one of the pendent arms 17. The lowermost or normal position of the carriage is determined by stops 27 located in the side plates of the main frame and against which the bottom of the carriage shift rail 6 abuts.

28 indicates ordinary type bar guide, 29 a ribbon vibrator, 30 the escape wheel, 31 the escapement rocker comprising fast and loose dogs, 32 a gear on the shaft of the escape wheel and 33 the rack.

At the side of the machine there is a projection or bracket 34 fast on one of the arms 17 that coöperates with a latch 35 to which is connected a link 36. In the operation of shifting the carriage, the latch 35 is first withdrawn and then the carriage shifted by the strain of link 24.

37 indicates the type bar segment and 38 a pivot rod therein upon which the type bars are mounted.

The bracket 14 is rigidly mounted centrally of the machine on the shift rail 6. In it is pivoted the escapement rocker 31 and near its upper end is the bearing for the shaft of the escape wheel 30. The weight of the shift rail and associated parts that move vertically with it is counter-balanced by a coiled spring 39 attached to the arm 22 and to some fixed part of the main frame of the machine.

It is thought that the drawing is a sufficient illustration since it indicates a machine of a general construction well known as the "Standard" manufactured by the Royal Typewriter Company.

I claim:

1. A typewriting machine comprising a carriage shift rail with a portion of a ball race in its upper face, the bottom rail of a shifting carriage having on its under face the companion portion of said ball race, by the shift rail and with which said gears loosely encircling the balls, a rack carried by the shift rail and with which said gears mesh on one side and a rack carried by the carriage bottom rail with which the gears mesh on the opposite side.

2. A typewriting machine comprising a carriage shift rail with a portion of a ball race in its upper face, the bottom rail of a shifting carriage having on its under face the companion portion of said ball race, bearing balls in said race, horizontally disposed annular gears loosely encircling the balls, a rack carried by the shift rail and with which said gears mesh on one side and a rack carried by the carriage bottom rail with which the gears mesh on the opposite side.

3. A typewriting machine comprising a carriage shift rail with a portion of a ball race in its upper face, the bottom rail of a shifting carriage having on its under face the companion portion of said ball race, bearing balls in said race, annular gears loosely encircling the balls, a rack integral with the shift rail and with which said gears mesh on one side and a rack integral with the carriage bottom rail with which the gears mesh on the opposite side.

4. A typewriting machine comprising a carriage shift rail with a portion of a ball race in its upper face, the bottom rail of a shifting carriage having on its under face the companion portion of said ball race, bearing balls in said race, horizontally disposed annular gears loosely encircling the balls, a rack carried by the shift rail and with which said gears mesh on one side and a rack carried by the carriage bottom rail with which the gears mesh on the opposite side, said race being vertically below the axis of the platen, and a guide in rear of the platen and in the horizontal plane of its axis upon which the carriage is guided.

5. A typewriting machine comprising a carriage supporting rail with a portion of a ball race in its upper face, the bottom rail of a carriage having on its under face the companion portion of said ball race, bearing balls in said race, horizontally disposed annular gears loosely encircling the balls, a rack carried by the carriage supporting rail and with which said gears mesh on one side and a rack carried by the carriage bottom rail with which the gears mesh on the opposite side.

6. A typewriting machine comprising a carriage supporting rail with a portion of a ball race in its upper face, the bottom rail of a carriage having on its under face the companion portion of said ball race, bearing balls in said race, annular gears loosely encircling the balls, a rack integral with the carriage supporting rail and with which said gears mesh on one side and a rack integral with the carriage bottom rail with which the gears mesh on the opposite side.

7. A typewriting machine comprising a carriage supporting rail with a portion of a ball race in its upper face, the bottom rail of a carriage having on its under face the companion portion of said ball race, bearing balls in said race, horizontally disposed annular gears loosely encircling the balls, a rack carried by the carriage supporting rail and with which said gears mesh on one side and a rack carried by the carriage bottom rail with which the gears mesh on the opposite side, said race being vertically below the axis of the platen, and a guide in rear of the platen and in the horizontal plane of its axis upon which the carriage is guided.

In testimony whereof, I have hereunto subscribed my name.

EDWARD B. HESS.

Witnesses:
L. L. BROWNING,
D. F. CRANDALL.